Patented June 19, 1928.

1,674,351

UNITED STATES PATENT OFFICE.

KARL ZAHN AND WILHELM ECKERT, OF HOCHST-ON-THE-MAIN, GERMANY, ASSIGNORS TO GRASSELLI DYESTUFF CORPORATION, OF NEW YORK, N. Y., A CORPORATION OF DELAWARE.

BENZANTHRONE DERIVATIVES AND PROCESS OF PRODUCING THE SAME.

No Drawing. Application filed May 27, 1926, Serial No. 112,130, and in Germany June 27, 1925.

Our present invention relates to new benzanthrone derivatives.

We have found that valuable derivatives of benzanthrone are obtained by treating nitrobenzanthrones with an alkali metal sulfite. The new compounds thus obtained are soluble in water and probably constitute sulfonic acids of aminobenzanthrones, the preparation of which in any other way has not been described hitherto. They are already dyestuffs per se and give brilliant red dyeings for instance on wool, silk and acetate silk; they are, however, also particularly useful as parent material for the production of other dyestuffs.

The following example serves to illustrate our invention, but is not intended to limit it thereto:

100 parts of nitrobenzanthrone, as it is obtained according to Example 1 of patent of addition No. 6,435 to French Patent No. 349,531 are brought into a finely subdivided form, preferably into the form of a paste, and then boiled on the reflux cooler with 1000 parts of a technical solution of sodium bisulfite until the whole or nearly the whole mass has undergone reaction. After having diluted the mass with hot water the unattacked parent material is isolated by filtration. The resulting solution is then acidified, the sulfurous acid is expelled by boiling for a short time and the reaction product is separated by the addition of common salt. When dry, it forms a dark red powder which readily dissolves in hot water to a red solution. Its solution in concentrated sulfuric acid is of a brownish yellow color with a black fluorescence. It dyes wool in an acid bath bright red tints.

We claim:

1. Benzanthrone derivatives substantially identical with the products obtainable by treating a nitrobenzanthrone with an alkali metal bisulfite, being red powders, soluble in hot water with a red color, in concentrated sulfuric acid with a fluorescent brownish yellow color, dyeing wool from an acid solution brilliant red tints.

2. Benzanthrone-Bz-1-amino-2-sulfonic acid of the following formula:

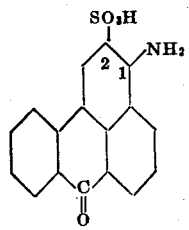

which in the dried form is a dark-red powder which dissolves in hot water with a red color and in concentrated sulfuric acid with a brownish-yellow color showing a weak fluorescence and which dyes wool from an acid bath bright red shades.

In testimony whereof, we affix our signatures.

KARL ZAHN.
WILHELM ECKERT.